United States Patent
Chae et al.

(10) Patent No.: US 11,658,355 B2
(45) Date of Patent: May 23, 2023

(54) METHOD AND SYSTEM FOR ANALYZING SWELLING BEHAVIOR OF LITHIUM SECONDARY BATTERY

(71) Applicant: LG Chem, Ltd., Seoul (KR)

(72) Inventors: Byung Joon Chae, Daejeon (KR); Yongjun Kim, Daejeon (KR); Jonggeol Kim, Daejeon (KR); Jong Seok Jeong, Daejeon (KR)

(73) Assignee: LG Energy Solution, Ltd.

( * ) Notice: Subject to any disclaimer, the term of this patent is extended or adjusted under 35 U.S.C. 154(b) by 128 days.

(21) Appl. No.: 17/158,528

(22) Filed: Jan. 26, 2021

(65) Prior Publication Data

US 2021/0234207 A1     Jul. 29, 2021

(30) Foreign Application Priority Data

Jan. 29, 2020   (KR) .................. 10-2020-0010333
Dec. 7, 2020    (KR) .................. 10-2020-0169322

(51) Int. Cl.
*H01M 10/48*   (2006.01)
*G01N 23/04*   (2018.01)
*H01M 10/44*   (2006.01)

(52) U.S. Cl.
CPC ............ *H01M 10/48* (2013.01); *G01N 23/04* (2013.01); *H01M 10/44* (2013.01)

(58) Field of Classification Search
None
See application file for complete search history.

(56) References Cited

U.S. PATENT DOCUMENTS

2022/0278381 A1*   9/2022   Ito .................... G01N 23/20025

FOREIGN PATENT DOCUMENTS

| JP | 2008277031 A | * | 11/2008 | ............ H01G 11/26 |
| JP | 2015117973 A |   | 6/2015  |                        |
| JP | 5815617 B2   |   | 11/2015 |                        |
| JP | 2016051642 A |   | 4/2016  |                        |
| JP | 6001604 B2   |   | 10/2016 |                        |

(Continued)

OTHER PUBLICATIONS

JP2008277031A—Machine Translation (Year: 2008).*

(Continued)

*Primary Examiner* — Brian R Ohara
*Assistant Examiner* — Patrick Marshall Greene
(74) *Attorney, Agent, or Firm* — Lerner David LLP (57) ABSTRACT

A method for analyzing a swelling behavior of a lithium secondary battery includes: (S1) installing a detachable pressurizing holder for fixing a battery sample and a charge/discharge cable connected with an external charging/discharging device to an X-ray CT (computed tomography) imaging equipment; (S2) inserting the battery sample into the pressurizing holder, contacting an electrode lead of the battery sample with a terminal of the charge/discharge cable, and then operating the external charging/discharging device to perform charging and discharging; and (S3) while rotating the battery sample during charging and discharging of the battery sample, irradiating and scanning the X-ray on the battery sample at an angle ranging from −10° to 10° to obtain a 3D image, and then measuring a change in the thickness of the electrode inside the battery sample from the 3D image.

9 Claims, 6 Drawing Sheets

(56) References Cited

FOREIGN PATENT DOCUMENTS

| JP | 2017139089 A | 8/2017 |
|----|--------------|--------|
| KR | 101699809 B1 | 1/2017 |
| KR | 101705703 B1 | 2/2017 |
| KR | 20170100323 A | 9/2017 |
| KR | 20180042723 A | 4/2018 |
| KR | 20190111342 A | 10/2019 |

OTHER PUBLICATIONS

Shimadzu Microfocus SMX-225CTf Spec Sheet (Year: 2022).*
Bond, Toby, et al., "Electrode Stack Geometry Changes during Gas Evolution in Pouch-Cell-Type Lithium Ion Batteries." Journal of The Electrochemical Society, vol. 164, Issue 1, Published Nov. 22, 2016, pp. A6158-A6162.
Nature Communications; "In-operando high-speed tomography of 10 lithium-ion batteries during thermal runaway", dated Apr. 2015, p. 1-10.
European Search Report for Application No. EP 21152220.6, dated May 7, 2021, 8 pages.

* cited by examiner

METHOD AND SYSTEM FOR ANALYZING SWELLING BEHAVIOR OF LITHIUM SECONDARY BATTERY

CROSS-REFERENCE TO RELATED APPLICATIONS

This application claims the benefit of priority based on Korean Patent Application No. 10-2020-0010333 filed on Jan. 29, 2020 and Korean Patent Application No. 10-2020-0169322 filed on Dec. 7, 2020, and all contents disclosed in the patent document are included as part of this specification.

TECHNICAL FIELD

The present invention relates to a method for analyzing swelling behavior of a lithium secondary battery in an in-situ manner without disassembling the battery, and an analysis system therefor.

BACKGROUND OF THE INVENTION

As technology development and demand for a mobile device increase, the demand for a rechargeable, miniaturized, and large-capacity secondary battery is rapidly increasing. In particular, a lithium secondary battery has high energy density per unit weight and can be rapidly charged compared to other secondary batteries such as a conventional lead storage battery, nickel-cadmium battery, nickel-hydrogen battery, and nickel-zinc battery.

The lithium secondary battery is configured to embed in a battery case an electrode assembly consisting of a positive electrode and a negative electrode, which are coated with an active material on a current collector, and a porous separator for separating them, and to inject an electrolyte containing a lithium salt into the electrode assembly, thereby producing electric energy by oxidation and reduction reactions when a lithium ion is inserted/desorbed from the positive electrode and the negative electrode. This secondary battery may be classified into a rectangular shape, a cylindrical shape, and a pouch shape depending on a shape of the battery case.

Since a volume of the positive electrode and the negative electrode of such a lithium secondary battery changes due to insertion/desorption of a lithium ion during charging and discharging, there is a problem of deterioration in performance depending on a degree of use of the battery.

Figure 1:
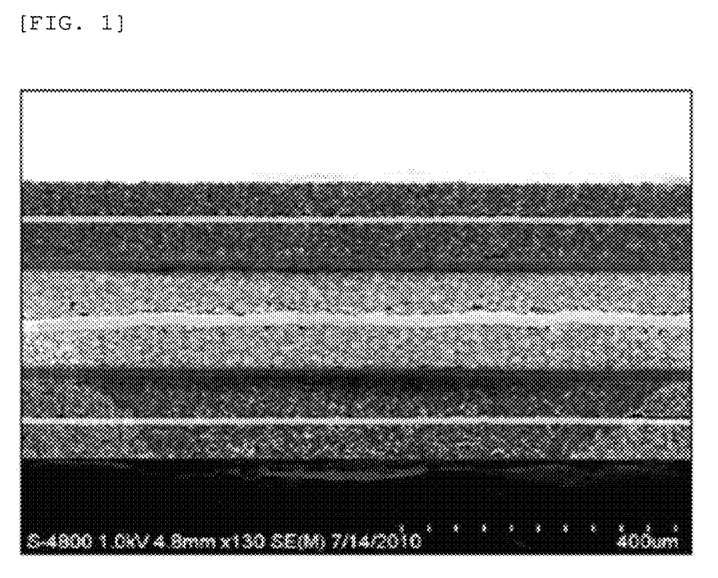
FIG. 1 is a SEM photograph showing a cross-sectional structure of a bi-cell electrode analyzed by a conventional ex-situ method.

In order to observe a swelling behavior caused by the change in the volume inside the battery according to the charging and discharging conditions, conventionally, an ex-situ method of disassembling a battery cell under a certain SOC (state of charge) condition and then observing the electrode thickness with an electron microscope such as a SEM has been used. FIG. 1 shows a SEM photograph of analyzing a cross-sectional structure of an electrode after sampling a specific cell by disassembling a multi-stacked bi-cell in the conventional ex-situ method. Such an ex-situ disassembling analysis makes impossible to analyze the structure of the entire cell inside a pouch because a maximum width of the bi-cell electrode area that can be observed is limited to within 1 mm, and may cause an error that differs from the actual thickness due to the formation of by-products inside the electrode during the sampling process.

Figure 2:
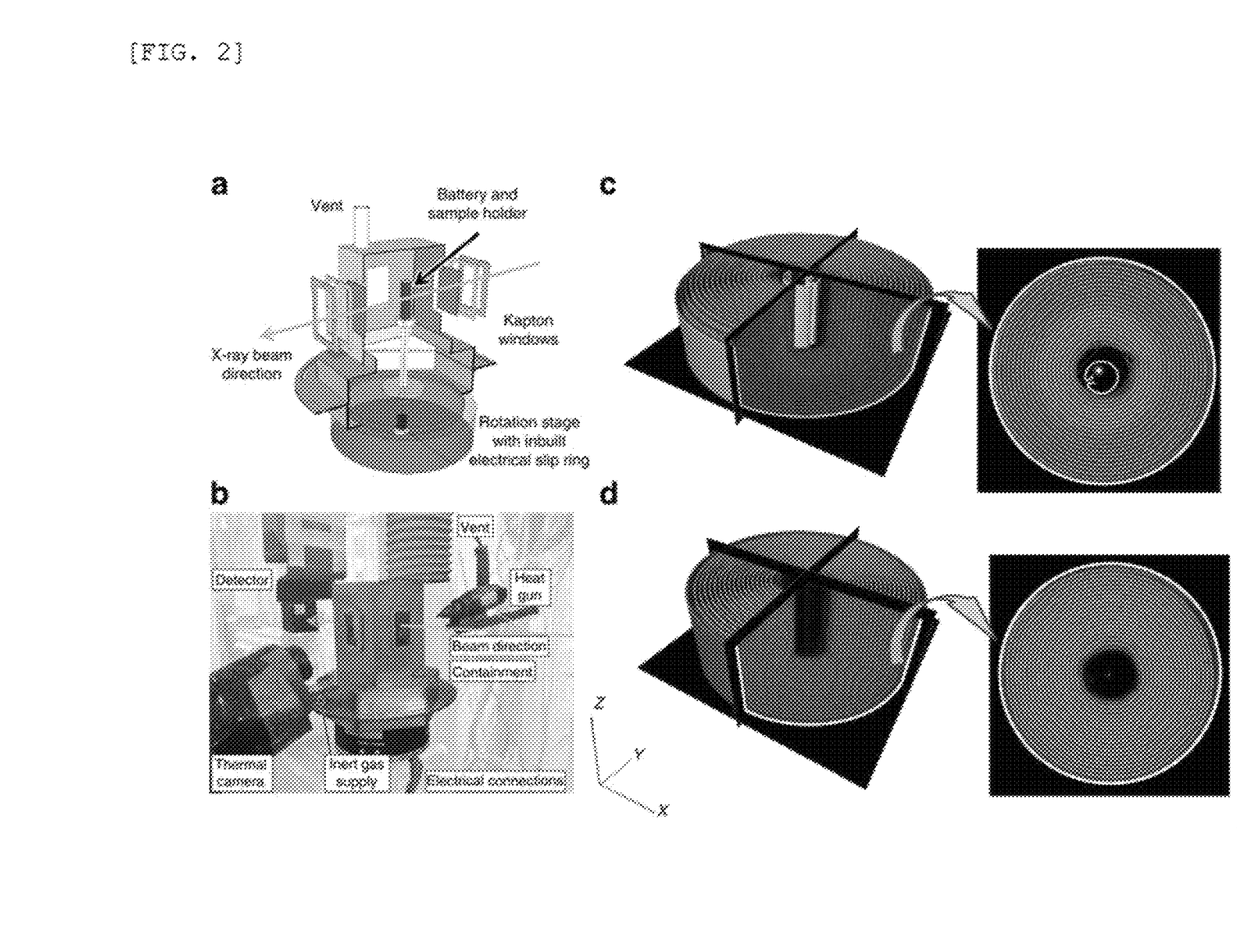
FIG. 2 shows an analysis process of a cylindrical cell by an in-situ method using a conventional Synchrotron X-ray CT.

On the other hand, in order to observe a change in a state without disassembling the battery, an in-situ X-ray imaging technique that analysis the electrode by directly transmitting a high-speed X-ray to the secondary battery using an accelerator has also been used. FIG. 2 shows an analysis process of the cylindrical battery by the in-situ method using a conventional Synchrotron X-ray CT (see Nature Communications, "In-operando high-speed tomography of lithium-ion batteries during thermal runaway", FIG. 1, April 2015). An equipment used in this process is limited to a shape and a size of the battery that can be applied because only the cylindrical battery can be mounted on a sample holder.

Accordingly, there is a need for a method capable of more efficiently analyzing a change in a state of the electrode according to the charging/discharging process without disassembling the electrode by applying it to various shapes and sizes of the battery.

SUMMARY OF THE INVENTION

The present invention provides a method for analyzing a change in the structure inside an electrode during charging and discharging in real time by establishing a state in which a battery can be charged and discharged in a commercially available X-ray computed tomography (CT) equipment for laboratory (lab), and an analysis system therefor.

An aspect of the present invention provides a method for analyzing a swelling behavior of a lithium secondary battery, the method comprising the steps of:

(S1) installing a detachable pressurizing holder for fixing a battery sample and a charge/discharge cable connected with an external charging/discharging device to an X-ray CT imaging equipment;

(S2) inserting the battery sample into the pressurizing holder, contacting an electrode lead of the battery sample with a terminal of the charge/discharge cable, and then operating the external charging/discharging device to perform charging and discharging; and (S3) while rotating the battery sample during charging and discharging of the battery sample, irradiating and scanning the X-ray on the battery sample at an angle ranging from −10° to 10° to obtain a 3D image, and then measuring a change in the thickness of the electrode inside the battery sample from the 3D image.

Further, the present invention provides an analysis system for performing the above analysis method, the analysis system comprising:

(i) a X-ray CT imaging equipment;

(ii) a detachable pressurizing holder installed to the X-ray CT imaging equipment to fix a battery sample; and (iii) a charge/discharge cable for connecting the battery sample to an external charging/discharging device.

Effect of the Invention

According to the present invention, it is possible to analyze in real time a swelling behavior of an electrode, that is, a change in the thickness inside the electrode, during charging and discharging without disassembling a battery, by installing a pressurizing holder for fixing a battery sample and a charge/discharge cable capable of being connected with an external charging/discharging device to an X-ray CT imaging equipment for laboratory to establish a state in which the battery sample can be charged and discharged, and then scanning the X-ray on the battery sample at a specific angle while charging and discharging.

DETAILED DESCRIPTION

Hereinafter, the present invention will be described in detail with reference to the accompanied drawings. The terms or the words used in the specification and claims should be construed not to be limited to their conventional or dictionary meanings, but to be meanings and concepts consistent with the technical idea of the present invention, based on the principle that the inventor can properly define the concepts of terms in order to explain his/her own invention in the best way.

Further, the embodiments described in the specification and the configurations shown in the drawings are merely the most preferred embodiment of the present invention, and do not represent all the technical spirit of the present invention, and, therefore, it should be understood that there may be various equivalents and modifications which may be substituted for them at the time of filing this application.

An embodiment of the present invention relates to a method for analyzing a swelling behavior according to a charging/discharging process without disassembling a lithium secondary battery.

In order to analyze the swelling behavior of the lithium secondary battery according to the present invention, first, a detachable pressurizing holder for fixing a battery sample and a charge/discharge cable connected with an external charging/discharging device are installed to an X-ray computed tomography (CT) imaging equipment (step S1).

The X-ray CT imaging equipment used in the present invention is a commercially available laboratory (lab) equipment, and is distinguished from a conventional Synchrotron X-ray CT imaging equipment (see FIG. 2) in that it does not utilize an accelerator. The Synchrotron X-ray CT imaging equipment has been used in an in-situ X-ray imaging technology that directly transmits and analyzes a high-speed X-ray to the secondary battery using the accelerator. In other words, the present invention is significant in that it is possible to analyze the swelling behavior and the internal structure change of the battery more easily than the conventional equipment to which the accelerator has employed by using the laboratory-based equipment without limitation of a cell size and type.

Figure 3:
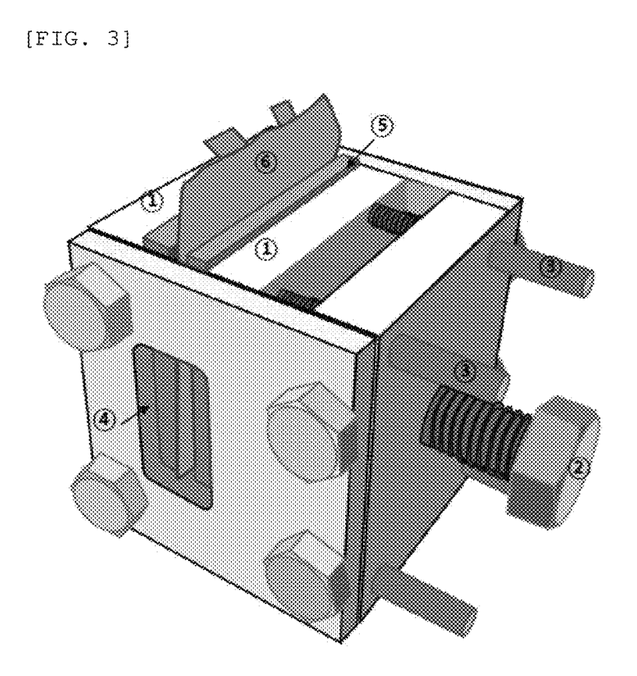
FIG. 3 is a schematic diagram of a pressurizing holder for fixing a battery sample to an X-ray CT imaging equipment which is used in an analysis method according to an embodiment of the present invention.

FIG. 3 is a schematic diagram of a pressurizing holder for fixing a battery sample to an X-ray CT imaging equipment which is used in an analysis method according to an embodiment of the present invention.

Referring to FIG. 3, the pressurizing holder used in the present invention is a device for fixing the battery sample, and includes a pair of pressurizing plate-shaped members 1 for accommodating the battery sample 6, a main screw 2 and auxiliary screws 3 for pressurization, and a window 4 for transmitting the X-ray. The pair of pressurizing plate-shaped members 1 are a structure that faces each other and is spaced apart from each other while the distance therebetween can be adjusted, and may be provided with a pressurizing sponge 5 for preventing a damage to the battery sample 6 between the pair of pressurizing plate-shaped members 1.

The pressurizing holder may be placed on a sample mounting unit of the X-ray CT imaging equipment in situ or may be installed using a separate fixing member. As the separate fixing member, an adhesive tape can be applied on the sample mounting unit of the equipment itself and a bottom of the pressurizing holder so that there is no movement during scanning of the X-ray. Since a shape and size of the pressurizing holder and the pair of plate-shaped members provided therein may be manufactured to match the size of the inserted battery sample, it is possible to apply the batteries of various shapes and sizes.

By inserting and pressurizing the battery sample between the pair of plate-shaped members in the pressurizing holder, it is possible to prevent the battery sample from drifting during the 3D imaging process of the battery sample using the X-ray CT imaging equipment.

Figure 4:
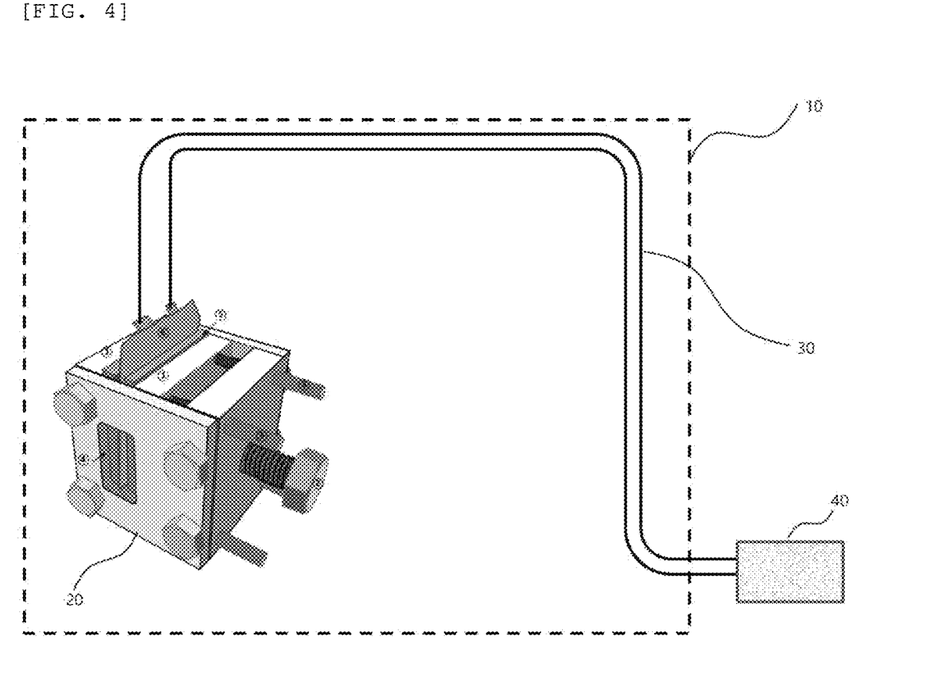
FIG. 4 schematically shows that the pressurizing holder of FIG. 3 is connected with a charging/discharging device which is located outside a X-ray CT imaging equipment through a charge/discharge cable.

FIG. 4 schematically shows that the pressurizing holder of FIG. 3 is connected with a charging/discharging device which is located outside a X-ray CT imaging equipment through a charge/discharge cable.

As shown in FIG. 4, the charge/discharge cable 30 connects an electrode lead of the battery sample inserted into the pressurizing holder 20 with the external charging/discharging device 40 inside the X-ray CT imaging equipment 10. Further, the charge/discharge cable 30 may be installed along a high-voltage cable copper line of the X-ray CT imaging equipment so as not to affect shield of the X-ray. For example, the charge/discharge cable may be installed in a zigzag form.

As such, the reason why the battery sample in the X-ray CT imaging equipment and the external charging/discharging device are connected through the charge/discharge cable is because there is no free space for installing the charging/discharging device in the place where a X-ray generator is located in case of the laboratory-based commercial CT imaging equipment used in the present invention, and additional structural modification for installing the charging/discharging device is not desirable in terms of safety. That is, the present invention adopts a method of connecting the charge/discharge cable with the external charging/discharging device along the high-voltage cable copper line in consideration of the internal structure of the CT imaging equipment itself, thereby allowing to perform charging and discharging in situ without disassembling the battery sample in the X-ray CT imaging equipment.

After establishing a state that can charge and discharge the battery sample in the X-ray CT imaging equipment as described above, the battery sample is inserted into the pressurizing holder and the electrode lead of the battery sample is contacted with a terminal of the charge/discharge cable, and then charging and discharging are performed by operating the external charging/discharging device (step S2).

The battery sample is housed in a pouch case in which a pouch-shaped secondary battery, i.e., an electrode assembly including a positive electrode, a negative electrode, and a separator interposed therebetween, is composed of a metal layer (foil) and a multilayer film of a synthetic resin layer coated on an upper and lower surfaces of the metal layer. An electrode tab and the electrode lead that are connected to the electrode assembly may have a shape protruding from the pouch case. Charging and discharging may be performed by electrically connecting the electrode lead with the external device to supply electric power. In addition, the battery sample of a circular or angular shape may be used.

The positive electrode and the negative electrode included in the battery sample may be prepared according to a method well known to the relevant art. For example, an active material layer may be formed by coating a slurry obtained by dispersing an electrode material including an active material, a conductive material, and a binder in a solvent on a foil-shaped current collector, followed by drying and rolling it.

The active material acts to insert and desorb lithium ions during the charging/discharging process of the secondary battery, and has no particular limitation as long as it is commonly used for the positive electrode or the negative electrode included in the secondary battery. For example, the positive electrode active material may include one or more selected from $LiCoO_2$, $LiNiO_2$, $LiMn_2O_4$, $LiCoPO_4$, $LiFePO_4$, and $LiNi_{1-x-y-z}Co_xM1_yM2_zO_2$, wherein M1 and M2 are independently of each other any one selected from the group consisting of Al, Ni, Co, Fe, Mn, V, Cr, Ti, W, Ta, Mg and Mo, and x, y and z are independently of each other $0<x<0.5$, $0<y<0.5$, $0<z<0.5$, $0<x+y+z<1$ as atomic fractions of oxide composition elements. The negative electrode active material may include one or more selected from lithium-containing titanium composite oxide (LTO), and oxides of Si, Sn, Li, Zn, Mg, Cd, Ce, Ni, or Fe.

During charging and discharging of the battery sample, the X-ray is irradiated and scanned at an angle in the range of −10° to 10° while rotating the battery sample to obtain a 3D image, and then a change in the thickness of the electrode inside the battery sample is measured from the 3D image (step S3). The irradiation range of the X-ray may be adjusted up to ±360° as necessary.

In general, the CT using the X-ray scans 360° to synthesize an image, but after the 360° scan is completed, a change between the captured image and the initial image occurs, making it impossible to align the 3D image. For this reason, it is difficult to observe in real time structural changes within the electrodes included in the battery that occur during the time the scan is completed. Therefore, in order to minimize the image change that occurs during the scan time, it is most accurate to check the change that occurs during the charging/discharging process on a 2D image in which the sample is fixed in a specific direction without rotation, but, with the 2D image that can only be observed in a live form, it is difficult to identify minute structural changes inside the electrode. The 3D scan is essential to overcome these shortcomings, that is, to obtain the 3D image with a higher resolution than the 2D image, and the irradiation and scan angle is advantageously set in the range from −10° to 10° so as to secure the shortest time required for shooting the 3D image. In the above range of the X-ray irradiation and scan, shooting of the 3D image of the battery sample can be performed within 2 minutes. If the irradiation and scan angle of the X-ray is out of the range of −10° to 10°, for example, if the irradiation and scan of the X-ray is performed at −20° or 20°, the analysis time will be longer, which makes it difficult to express the swelling change occurring inside the secondary battery cell to a three-dimensional image during shooting of the image. In other words, the irradiation and scan of the X-ray is preferably performed in the range of −10° to 10° to apply the shortest shooting time required to analyze the process of structural change that occurs by the swelling inside the cell with the three dimensions without deformation of the image.

According to the method of the present invention as described above, the swelling behavior of the electrode, that is, a change in the thickness inside the electrode, during charging and discharging can be analyzed in real time without disassembling the battery.

Further, in order to implement the analysis method as described above, the present invention provides an analysis system comprising:

(i) a X-ray CT imaging equipment;
(ii) a detachable pressurizing holder installed to the X-ray CT imaging equipment to fix a battery sample; and
(iii) a charge/discharge cable for connecting the battery sample to an external charging/discharging device.

In the analysis system, the description of the configuration overlapping with the above mentioned method is the same.

Hereinafter, Example will be described in detail to aid understanding of the present invention. However, the Example according to the present invention may be modified into various other forms, and the scope of the present invention should not be construed to be limited to the following Example. The Example of the present invention are provided to more completely explain the present invention to a person who has an average knowledge in the art.

EXAMPLE

A detachable pressurizing holder as shown in FIG. 3 was placed on a sample mounting unit of a commercial X-ray CT imaging equipment (Model Vtomex m300; BAKER HUGHES, GE CO., Germany) and a charge/discharge cable was installed along a high-voltage cable copper line of the above equipment, and then the pressurizing holder was connected to an external charging/discharging device through the charge/discharge cable (see FIG. 4).

Subsequently, a battery sample in a shape in which an electrode assembly was housed in a pouch case was prepared, wherein the electrode assembly was obtained by using, as a positive electrode, an electrode including an NCM-based active material containing Ni, Co, and Mn and using, as a negative electrode, an electrode including a Si active material having high capacity (1340 mAh) and exhibiting rapid volume expansion during a charging/discharging process. The battery sample was inserted between sponges in a pair of plate-shaped members (material: aluminum) inside the pressurizing holder, and an electrode lead of the battery sample was contacted with a terminal of the charge/discharge cable, and then the external charging/discharging device was operated to perform charging and discharging. In this case, charging and discharging of the battery sample was performed by applying a current density of 670 mAh/g (0.5 C rate) under a CC mode condition.

During charging and discharging of the battery sample, the X-ray was irradiated and scanned at an angle ranging from −10° to 10° within 2 minutes while rotating the battery sample to obtain a 3D image, and a change in the thickness of the electrode inside the battery sample was measured from the 3D image.

Figure 5:
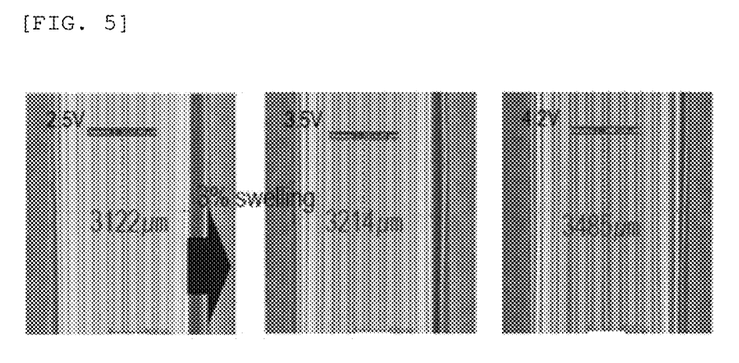
FIG. 5 shows a cross-sectional image of an electrode obtained by X-ray scan during charging and discharging of a pouch-shaped battery equipped with a Si negative electrode by an analysis method according to an embodiment of the present invention.

FIG. 5 shows a cross-sectional image of the electrode obtained by the X-ray scan during charging and discharging of a pouch-shaped battery provided with a Si negative electrode. It can be seen that swelling of about 3% occurs in the electrode according to a charging voltage, which means increase in the electrode thickness.

Figure 6:
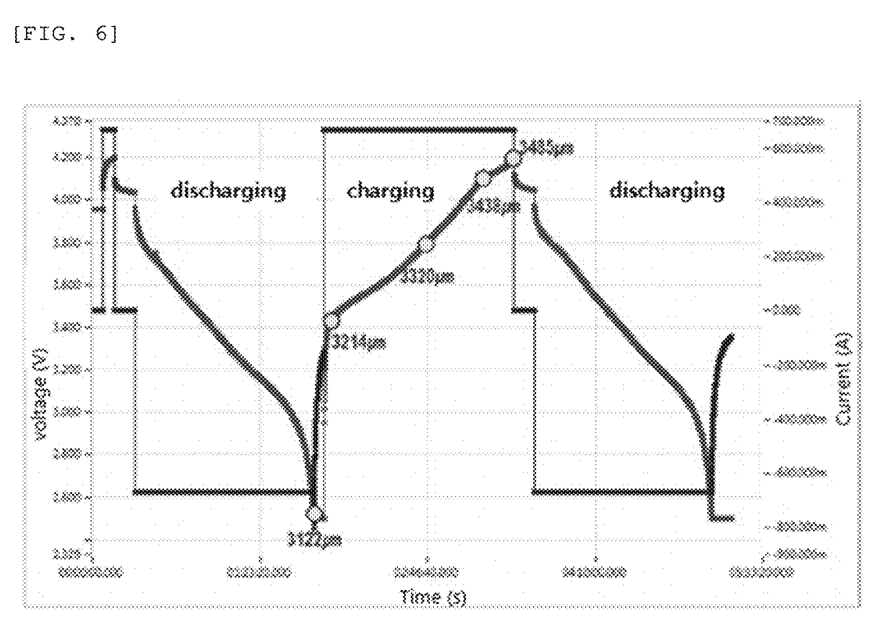
FIG. 6 is a graph showing thickness measurements on a charge/discharge voltage profile of a Si negative electrode analyzed by a method according to an embodiment of the present invention.
Figure 7:
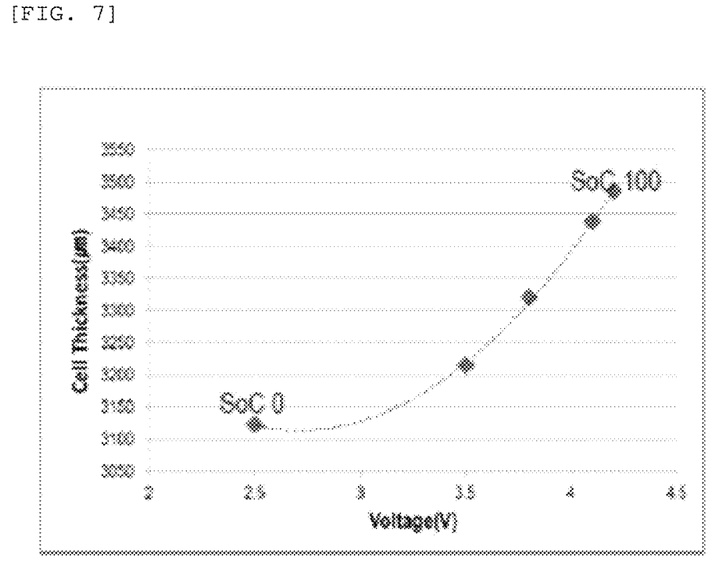
FIG. 7 is a graph showing a swelling behavior as a change in the thickness according to a charge status of a Si negative electrode analyzed by a method according to an embodiment of the present invention.

FIG. 6 shows thickness measurements on a charge/discharge voltage profile of the Si negative electrode, and FIG. 7 shows a swelling behavior as a change in the thickness according to a charge status (SOC 0% to 100%) of the Si negative electrode.

As can be seen from FIGS. 5 to 7, the swelling behavior of the electrode, that is, a change in the thickness inside the electrode, can be analyzed in real time without disassembling the battery by installing the pressurizing holder for fixing the battery sample and the charge/discharge cable connectable to the external charging/discharging device to the laboratory X-ray CT imaging equipment to establish a state that can perform charging and discharging of the battery sample, and then, irradiating and scanning the X-ray on the battery sample in the range of −10° to 10° while charging and discharging.

The invention claimed is:

1. A method for analyzing a swelling behavior of a lithium secondary battery, comprising:
   (S1) installing a detachable pressurizing holder for fixing a battery sample and a charge/discharge cable connected with an external charging/discharging device to an X-ray computed tomography (CT) imaging equipment;
   (S2) inserting the battery sample into the detachable pressurizing holder, contacting an electrode lead of the battery sample with a terminal of the charge/discharge cable, and then operating the external charging/discharging device to perform charging and discharging; and
   (S3) during the performing of charging and discharging of the battery sample, irradiating and scanning X-ray on the battery sample at an angle ranging from −10° to 10° while rotating the battery sample to obtain a 3D image, and then measuring a change in the thickness of the electrode inside the battery sample from the 3D image,
   wherein the detachable pressurizing holder includes a pair of plate-shaped members parallel to the surface of the cell sample and a pair of pressurizing sponges interposed between the pair of plate-shaped members, and the battery sample is inserted between the pressurizing sponges.

2. The method of claim 1, wherein the detachable pressurizing holder is placed on a sample mounting unit of the X-ray CT imaging equipment in situ or installed using a separate fixing member.

3. The method of claim 1, wherein the charge/discharge cable is installed in a zigzag form along a high-voltage cable copper line of the X-ray CT imaging equipment to connect the battery sample inside the X-ray CT imaging equipment with the external charging/discharging device without affecting shield of the X-ray.

4. The method of claim 1, wherein the X-ray CT imaging equipment is a laboratory equipment that does not utilize an accelerator.

5. The method of claim 1, wherein the scanning in the step (S3) is performed within 2 minutes.

6. The method of claim 1, wherein the measurement of a change in the electrode thickness of the battery sample is performed in a range of 0% to 100% of SOC (state of charge).

7. The method of claim 1, wherein the battery sample is a pouch-shaped lithium secondary battery.

8. The method of claim 1, wherein the battery sample includes an NCM-based positive electrode containing Ni, Co, and Mn, and a Si-based negative electrode.

9. An analysis system for performing the analysis method of claim 1, the analysis system comprising:
   (i) an X-ray CT imaging equipment;
   (ii) a detachable pressurizing holder installed to the X-ray CT imaging equipment to fix a battery sample; and
   (iii) a charge/discharge cable for connecting the battery sample to an external charging/discharging device,
   wherein the detachable pressurizing holder includes a pair of plate-shaped members parallel to the surface of the cell sample and a pair of pressurizing sponges interposed between the pair of plate-shaped members, and the battery sample is inserted between the pressurizing sponges.

* * * * *